(12) United States Patent
Su

(10) Patent No.: US 9,821,393 B2
(45) Date of Patent: Nov. 21, 2017

(54) CUTTING TOOL FOR TRIMMING WORKPIECE

(71) Applicant: Cheng-Wei Su, Taichung (TW)

(72) Inventor: Cheng-Wei Su, Taichung (TW)

( * ) Notice: Subject to any disclaimer, the term of this patent is extended or adjusted under 35 U.S.C. 154(b) by 0 days.

(21) Appl. No.: 15/190,234

(22) Filed: Jun. 23, 2016

(65) Prior Publication Data

US 2017/0291240 A1 Oct. 12, 2017

(30) Foreign Application Priority Data

Apr. 11, 2016 (TW) .............................. 105111210 A

(51) Int. Cl.
*B23B 5/16* (2006.01)
*B23G 9/00* (2006.01)

(52) U.S. Cl.
CPC .............. *B23G 9/003* (2013.01); *B23B 5/167* (2013.01); *B23G 2240/08* (2013.01); *Y10T 408/893* (2015.01); *Y10T 408/899* (2015.01)

(58) Field of Classification Search
CPC . Y10T 408/899; Y10T 408/893; B23B 5/167; B23B 5/168; B23G 9/003
See application file for complete search history.

(56) References Cited

U.S. PATENT DOCUMENTS

| | | | | |
|---|---|---|---|---|
| 651,377 A * | 6/1900 | McDermott | ............ | B23B 51/00 408/223 |
| 1,228,951 A * | 6/1917 | Morton | ................... | B23B 51/00 15/105 |
| 2,242,821 A * | 5/1941 | Fanslow | ................. | B23B 5/167 408/211 |
| 2,354,245 A * | 7/1944 | Corbosiero | ............ | E03F 9/002 15/104.09 |
| 3,020,787 A * | 2/1962 | Cusick | .................... | B23B 5/167 408/201 |
| 3,242,526 A * | 3/1966 | Wilton | .................... | F21V 35/00 30/451 |
| 3,365,773 A * | 1/1968 | Olsen | ...................... | B23B 5/167 407/49 |
| 3,754,832 A * | 8/1973 | Stickler | ................... | B23B 5/167 408/207 |
| 4,678,380 A * | 7/1987 | Zahuranec | ............. | B23B 5/167 407/33 |
| 4,798,503 A * | 1/1989 | Huju | ....................... | B23B 49/04 144/219 |
| 5,004,383 A * | 4/1991 | Elliott, Jr. | ............... | B23B 5/167 408/199 |
| 6,835,029 B2 * | 12/2004 | Salzer | .................... | B23B 5/167 408/1 R |
| 9,339,872 B2 | 5/2016 | Zenke et al. | | |

* cited by examiner

*Primary Examiner* — Daniel Howell
(74) *Attorney, Agent, or Firm* — Alan D. Kamrath; Kamrath IP Lawfirm, P.A.

(57) ABSTRACT

A cutting tool includes a body including a connecting end, a cutting end which includes a space for receiving the work piece, at least one projection with a ridge defining at least one cutting edge for cutting the work piece, and at least one slot for allowing pieces trimmed from the workpiece to exit from the body. The space has a top and a bottom and tapers outwardly from the top to the bottom. The at least one cutting edge has a first end adjacent to the top of the space and a second end adjacent to the bottom of the space and extends from the first end to the second end obliquely. The body is rotatable about a first axis, and the first axis extends longitudinally between the first and second ends of the body.

13 Claims, 5 Drawing Sheets

CUTTING TOOL FOR TRIMMING WORKPIECE

BACKGROUND OF THE INVENTION

1. Field of the Invention

The present invention relates to a cutting tool and, particularly, to a cutting tool adapted to rotate relative to a workpiece and to trim the workpiece.

2. Description of the Related Art

Generally, it is easy to engage a screw with a nut, but it becomes difficult if the screw is corroded, covered with dirt, or damaged. So, a screw die, which can create threads, is commonly used to trim damaged threads or to remove dirt from the screw. However, when using such screw die, it needs to be careful to avoid cutting threads which do not suffer the set forth problems. Therefore, it is inconvenient to use a screw die to trim the damaged threads or to remove dirt from the screw.

The present invention is, therefore, intended to obviate or at least alleviate the problems encountered in the prior art.

SUMMARY OF THE INVENTION

According to the present invention, a cutting tool includes a body including a connecting end at a first end for engaging with a driving tool, and a cutting end at a second end and which includes a space for receiving the work piece, at least one projection with a ridge defining at least one cutting edge for cutting the work piece, and at least one slot for allowing pieces trimmed from the workpiece to exit from the body. The cutting end has an annular inner periphery and an annular outer periphery. The inner periphery delimits the space and defines the at least one projection and the at least one slot. The space has a top and a bottom and tapers outwardly from the top to the bottom and includes an annular opening at the bottom. The at least one protrusion protrudes radially from the inner periphery in a direction away from the outer periphery. The at least one slot extends radially from the inner periphery in a direction towards the outer periphery and through the outer periphery. The at least one cutting edge has a first end adjacent to the top of the space and a second end adjacent to the bottom of the space and extend from the first end to the second end obliquely. The body is rotatable about a first axis and the first axis extends longitudinally between the first and second ends of the body.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the public generally, and especially the scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting as to the scope of the invention in any way.

It is therefore an objective of the present invention to provide a cutting tool adapted to trim a workpiece.

It is another objective of the present invention that the cutting tool is adapted to trim a threaded fastener.

It is yet another objective of the present invention that the cutting tool neither unduly truncates the threaded fastener nor eliminates the numbers of threads.

It is yet another objective of the present invention that the cutting tool gets rid of trimmed pieces from the thread fastener easily and quickly.

It is yet another objective of the present invention that the cutting tool avoids the trouble of alignment as set forth.

Other objectives, advantages, and new features of the present invention will become apparent from the following detailed description of the invention when considered in conjunction with the accompanied drawings.

DETAILED DESCRIPTION OF THE INVENTION

Figure 1:
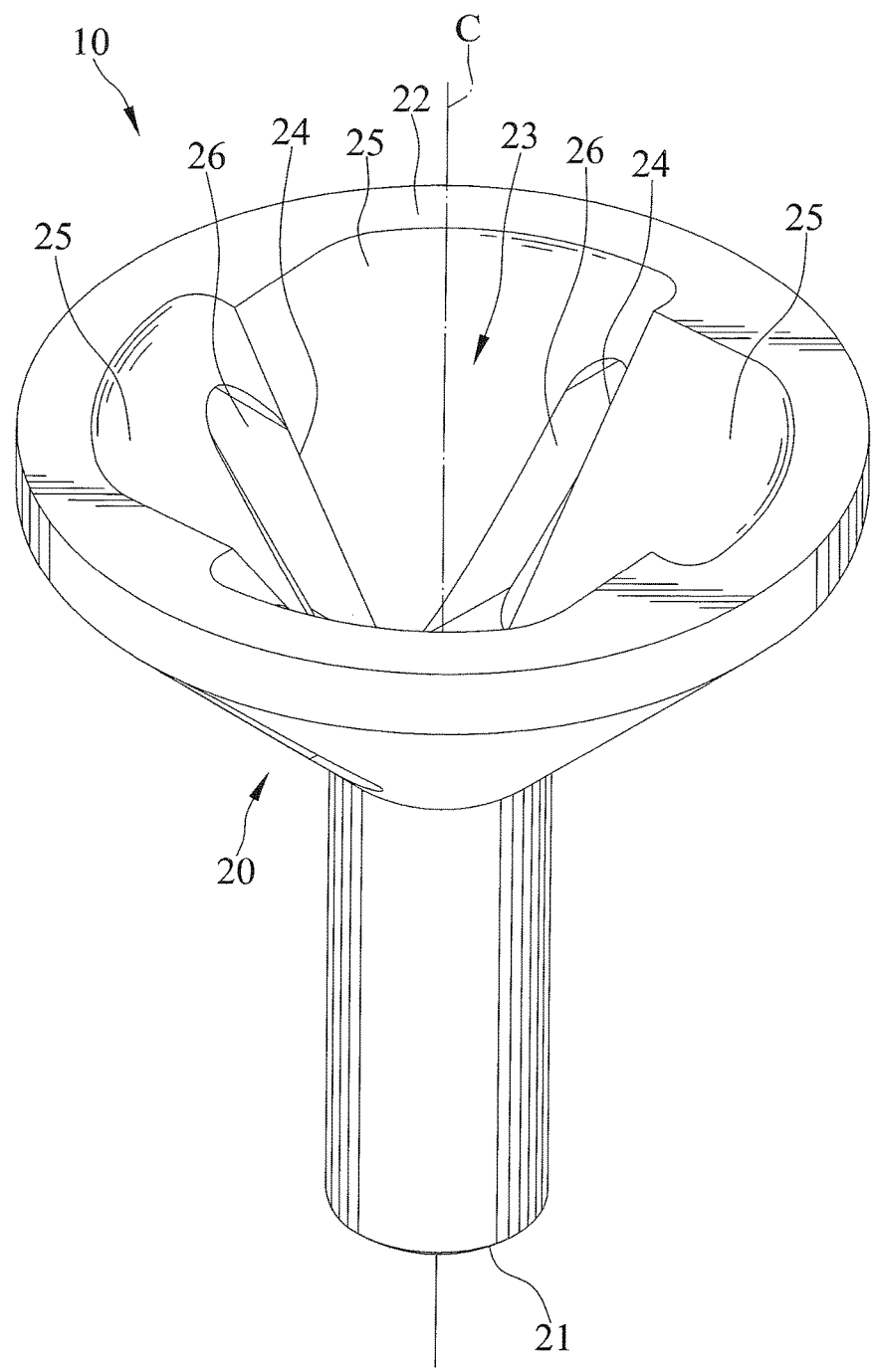
FIG. 1 is a perspective view of a cutting tool in accordance with the present invention.
Figure 2:
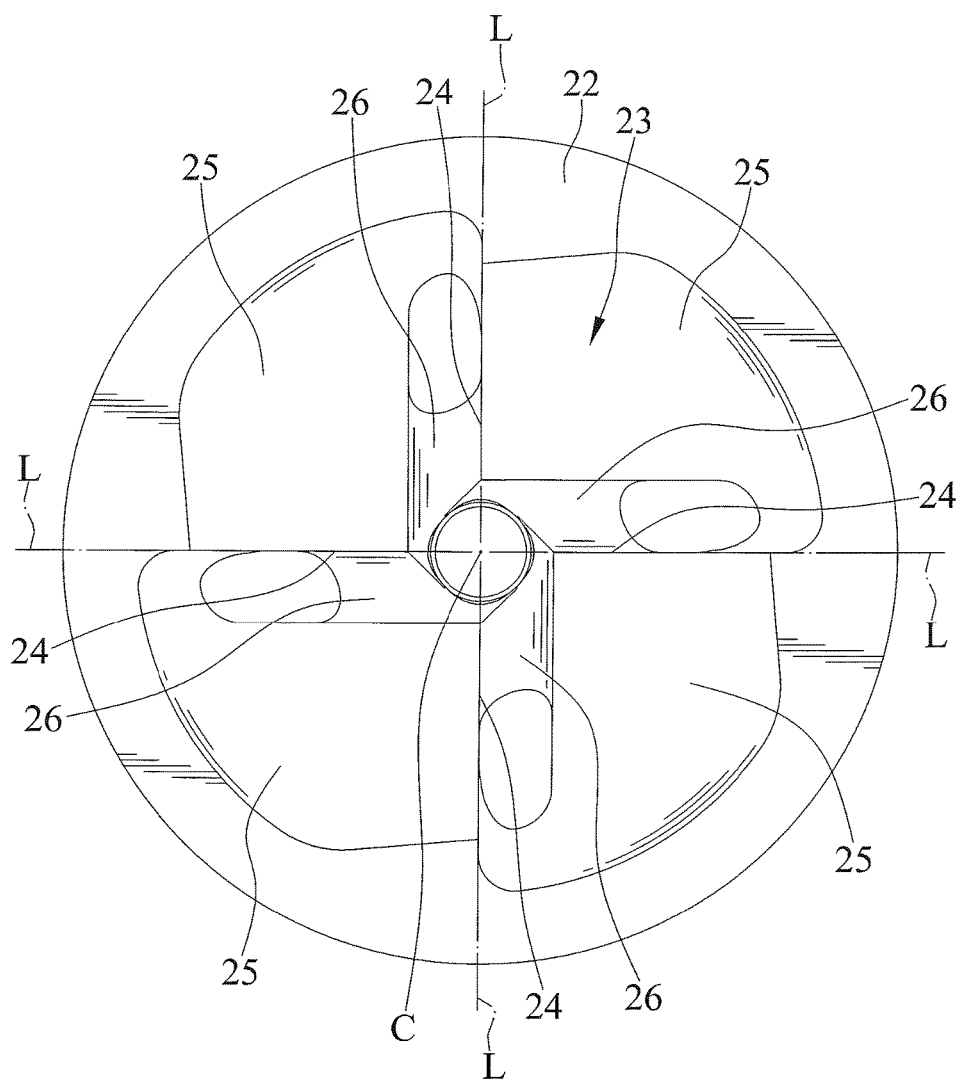
FIG. 2 is a top view of the cutting tool of the present invention.
Figure 3:
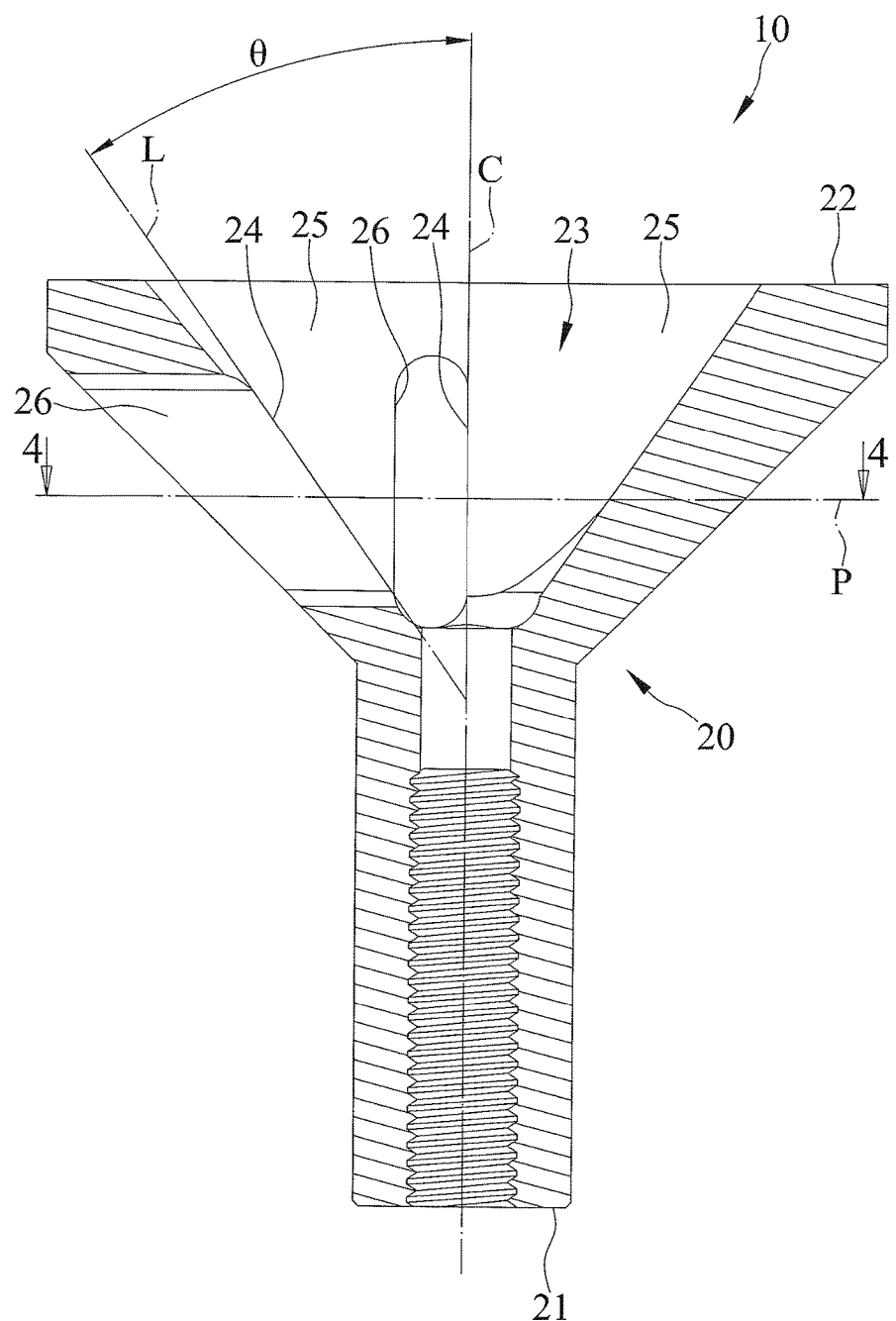
FIG. 3 is a cross-sectional view of the cutting tool of the present invention.
Figure 4:
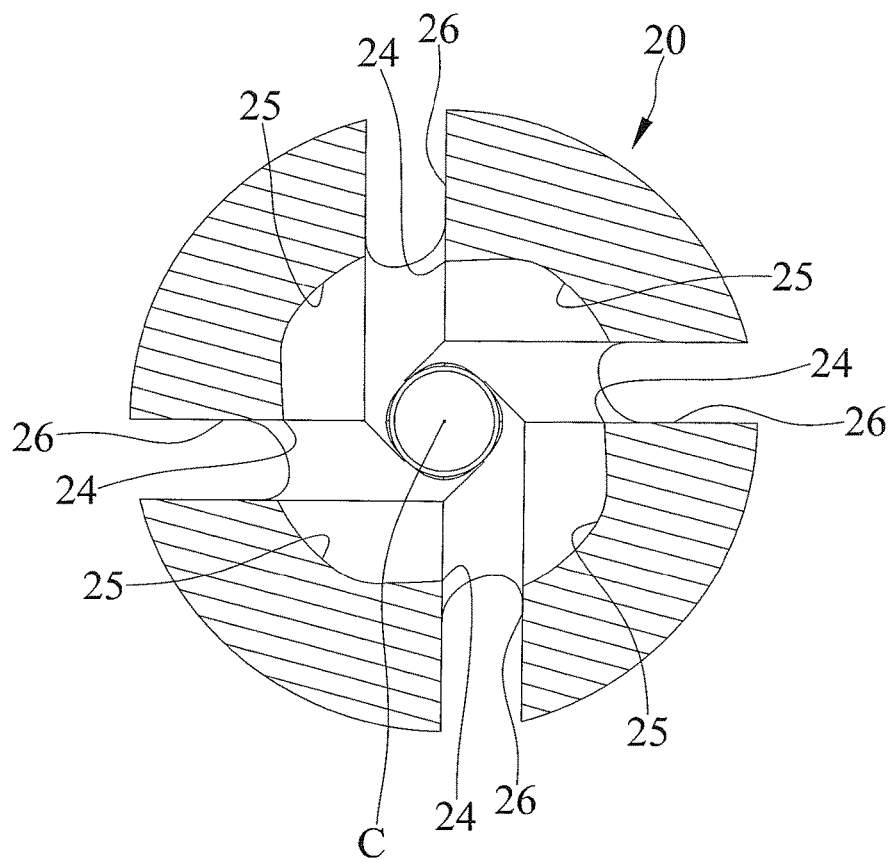
FIG. 4 is a cross-sectional view of the cutting tool of the present invention taken along line 4-4 of FIG. 3.

FIGS. 1 through 5 show a cutting tool 10 in accordance with the present invention. The cutting tool 10 is adapted to rotate relative to a workpiece and to trim the work piece.

The cutting tool 10 includes a body 20 including a connecting end 21 at a first end for engaging with a driving tool 90, and a cutting end 22 at a second end and which includes a space 23 for receiving the work piece, at least one projection with a ridge defining at least one cutting edge 24 for cutting the work piece, and at least one slot 26 for allowing pieces trimmed from the workpiece to exit from the body 20. The body 20 is a one-piece structure.

The cutting end 22 has an annular inner periphery and an annular outer periphery. The inner periphery delimits the space 23 and defines the at least one projection and the at least one slot 26. In the embodiment, the cutting end 22 includes a plurality of cutting edges 24 and a plurality of slots 26. The space 23 has a top and a bottom and tapers outwardly from the top to the bottom. The space 23 has a first diameter at the top and a second diameter at the bottom, respectively. The second diameter is greater than the first diameter. The space 23 includes an annular opening at the bottom. The workpiece to be trimmed by the cutting tool 10 can be inserted into the space 23 through the opening of the space 23. The at least one protrusion protrudes radially from the inner periphery in a direction away from the outer periphery. The at least one cutting edge 24 has a first end adjacent to the top of the space 23 and a second end adjacent to the bottom of the space 23 and extends from the first end to the second end obliquely. The at least one slot 26 extends radially from the inner periphery in a direction towards the outer periphery and through the outer periphery. The at least one slot 26 has a first end adjacent to the top of the space 23 and a second end adjacent to the bottom of the space 23 and extends from the first end to the second end obliquely and along the at least one cutting edge 24. The at least one slot 26 is positioned beside the at least one cutting edge 24. The inner periphery of the cutting end 22 defines first and second peripheral regions. The at least one projection includes a first side extending between the ridge and the first peripheral region and a second side extending between the ridge and the second peripheral region. The first and second peripheral regions are recessed and each defines a recess 25. Each of the first and second peripheral regions extends radially in the direction towards the outer periphery of cutting end 22. The two recesses 25 will not abut the workpiece. The at least one projection includes the first side with a first inclination and the second side with a second inclination respectively. The second inclination is greater than the first inclination. The at least one slot 26 extends between the second peripheral region and the ridge of the at least one projection.

In the embodiment, numbers of the plurality of cutting edges 24 and numbers of the plurality of slots 26 are the same. In the embodiment, the plurality of cutting edges 24 is circumferentially separated from one another, and the plurality of slots 26 is circumferentially separated from one another.

The body 20 is rotatable about a first axis C, and the first axis C extends longitudinally between the first and second ends of the body 20.

In a plane P which is perpendicular to the first axis C and extends across the inner periphery of the cutting end 22, the at least one cutting edge 24 defines a point and which is at a first radial distance from the first axis C. Furthermore, in the plane P, other radial distances between points defined by the inner periphery of the cutting end 22 and the first axis (C) is greater than the first radial distance.

In order to prevent the cutting tool 10 from unduly truncating the threaded fastener and eliminating numbers of threads, the at least one cutting edge 24 extends obliquely on a second axis L which is at an angle θ with respect to the first axis C, and the angle θ is in a range between 30 degrees and 68 degrees.

Figure 5:
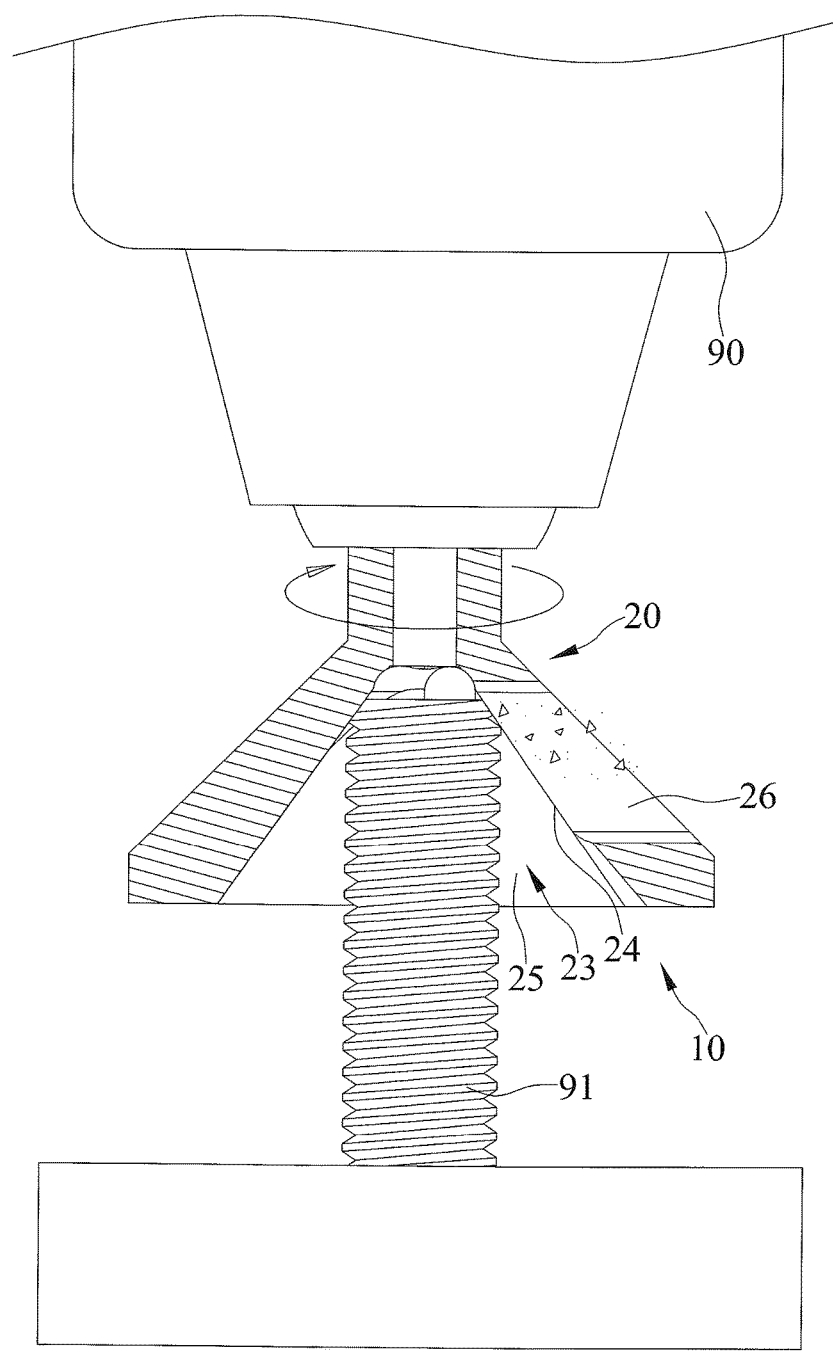
FIG. 5 illustrates the cutting tool of the present invention being operated to trim a workpiece.

FIG. 5 shows that the cutting tool 10 trimming a threaded fastener 91. The space 23 in the cutting end 22 receives an end of the threaded fastener 91. The cutting tool 10 is rotated. The at least one cutting edge 24 trims the threaded fastener 91. The trimmed pieces experience a centrifugal force inside the space 23 and exit from the body 20 through the at least one slot 26. The cutting tool 10 can be driven by a driving tool 90. Preferably, the driving tool 90 is a power tool.

In view of the forgoing, the cutting tool 10 is adapted to trim the threaded fastener 91 without unduly eliminating numbers of threads. The slots 26 allow the cutting tool 10 to get rid of the trimmed pieces easily and quickly.

The foregoing is merely illustrative of the principles of this invention, and various modifications can be made by those skilled in the art without departing from the scope and spirit of the invention.

What is claimed is:

1. A cutting tool adapted to rotate relative to a workpiece and to trim the workpiece, comprising:
   a body including a connecting end at a first end for engaging with a driving tool, and a cutting end at a second end and which includes a space for receiving the workpiece, at least one projection with a ridge defining at least one cutting edge for cutting the workpiece, and at least one slot for allowing pieces trimmed from the workpiece to exit from the body, wherein the cutting end has an annular inner periphery and an annular outer periphery, with the inner periphery delimiting the space and defining the at least one projection and the at least one slot, with the at least one protrusion protruding radially from the inner periphery in a direction away from the outer periphery, and with the at least one slot extending radially from the inner periphery in a direction towards the outer periphery and through the outer periphery;
   wherein the space has a top and a bottom and tapers outwardly from the top to the bottom and includes an annular opening at the bottom;
   wherein the at least one cutting edge has a first end adjacent to the top of the space and a second end adjacent to the bottom of the space and extend from the first end to the second end obliquely;
   wherein the body is rotatable about a first axis and the first axis extends longitudinally between the first and second ends of the body; and
   wherein the at least one cutting edge extends obliquely on a second axis, wherein the second axis is at an angle with respect to the first axis, and wherein the angle is in a range between 30 degrees and 68 degrees.

2. The cutting tool as claimed in claim 1, wherein in a plane which is perpendicular to the first axis and which extends across the inner periphery of the cutting end, the at least one cutting edge defines a point and which is at a first radial distance from the first axis, and wherein in the plane, other radial distances between points defined by the inner periphery of the cutting end and the first axis is greater than the first radial distance.

3. The cutting tool as claimed in claim 1, wherein the at least one slot has a first end adjacent to the top of the space and a second end adjacent to the bottom of the space and extends from the first end to the second end obliquely and along the at least one cutting edge.

4. The cutting tool as claimed in claim 1, wherein the inner periphery of the cutting end defines first and second peripheral regions, wherein the at least one projection includes a first side extending between the ridge and the first peripheral region and a second side extending between the ridge and the second peripheral region, wherein the first and second peripheral regions are recessed and each defines a recess, and wherein each of the first and second peripheral regions extends radially in the direction towards the outer periphery of cutting end.

5. A cutting tool adapted to rotate relative to a workpiece and to trim the workpiece, comprising:
   a body including a connecting end at a first end for engaging with a driving tool, and a cutting end at a second end and which includes a space for receiving the workpiece, at least one projection with a ridge defining at least one cutting edge for cutting the workpiece, and at least one slot for allowing pieces trimmed from the workpiece to exit from the body, wherein the cutting end has an annular inner periphery and an annular outer periphery, with the inner periphery delimiting the space and defining the at least one projection and the at least one slot, with the at least one protrusion protruding radially from the inner periphery in a direction away from the outer periphery, and with the at least one slot extending radially from the inner periphery in a direction towards the outer periphery and through the outer periphery;

wherein the space has a top and a bottom and tapers outwardly from the top to the bottom and includes an annular opening at the bottom;

wherein the at least one cutting edge has a first end adjacent to the top of the space and a second end adjacent to the bottom of the space and extend from the first end to the second end obliquely;

wherein the body is rotatable about a first axis and the first axis extends longitudinally between the first and second ends of the body;

wherein the inner periphery of the cutting end defines first and second peripheral regions, the at least one projection includes a first side extending between the ridge and the first peripheral region and a second side extending between the ridge and the second peripheral region, the first and second peripheral regions are recessed and each defines a recess, and each of the first and second peripheral regions extends radially in the direction towards the outer periphery of cutting end; and wherein the at least one projection includes the first side with a first inclination and the second side with a second inclination respectively, and wherein the second inclination is greater than the first inclination.

6. The cutting tool as claimed in claim 1, wherein the at least one slot is positioned beside the at least one cutting edge.

7. The cutting tool as claimed in claim 5, wherein the at least one slot extends between the second peripheral region and the ridge of the at least one projection.

8. The cutting tool as claimed in claim 1, wherein the at least one cutting edge includes a plurality of cutting edges and the at least one slot includes a plurality of slots, and wherein numbers of the plurality of cutting edges and numbers of the plurality of slots are the same.

9. The cutting tool as claimed in claim 8, wherein the plurality of cutting edges is circumferentially separated from one another, and wherein the plurality of slots is circumferentially separated from one another.

10. The cutting tool as claimed in claim 7, wherein the at least one slot has a first end adjacent to the top of the space and a second end adjacent to the bottom of the space and extends from the first end to the second end obliquely and along the at least one cutting edge.

11. The cutting tool as claimed in claim 10, wherein the at least one cutting edge extends obliquely on a second axis, wherein the second axis is at an angle with respect to the first axis, and wherein the angle is in a range between 30 degrees and 68 degrees.

12. The cutting tool as claimed in claim 11, wherein the at least one cutting edge includes a plurality of cutting edges and the at least one slot includes a plurality of slots, and wherein numbers of the plurality of cutting edges and numbers of the plurality of slots are the same.

13. The cutting tool as claimed in claim 12, wherein the plurality of cutting edges is circumferentially separated from one another, and wherein the plurality of slots is circumferentially separated from one another.

* * * * *